United States Patent [19]
Myllymäki

[11] Patent Number: 5,640,141
[45] Date of Patent: Jun. 17, 1997

[54] SURVEILLANCE AND ALARM DEVICE FOR ROOM SPACES

[76] Inventor: Matti Myllymäki, Sisämaantie 18 A, FIN-02610 Espoo, Finland

[21] Appl. No.: 331,580
[22] PCT Filed: May 6, 1993
[86] PCT No.: PCT/FI93/00194
§ 371 Date: Nov. 2, 1994
§ 102(e) Date: Nov. 2, 1994
[87] PCT Pub. No.: WO93/22755
PCT Pub. Date: Nov. 11, 1993

[30] Foreign Application Priority Data

May 6, 1992 [FI] Finland ................. U920339

[51] Int. Cl.$^6$ ........................... G08B 29/00
[52] U.S. Cl. ............. 340/506; 340/565; 340/561; 340/588; 340/331; 379/38; 379/40
[58] Field of Search ............. 340/506, 565, 340/561, 573, 588, 589, 286.05, 331, 332, 825.06; 379/37, 38, 40, 42

[56] References Cited

U.S. PATENT DOCUMENTS

| | | | |
|---|---|---|---|
| 4,308,911 | 1/1982 | Mandl | 340/506 |
| 4,567,557 | 1/1986 | Burns | 340/825.06 |
| 4,694,281 | 9/1987 | McDermott et al. | 340/331 |
| 4,796,010 | 1/1989 | Bland et al. | 340/506 |
| 4,855,723 | 8/1989 | Fritz et al. | 340/330 |

FOREIGN PATENT DOCUMENTS

| | | |
|---|---|---|
| 2181285 | 4/1987 | United Kingdom . |
| 2218552 | 11/1989 | United Kingdom . |
| WO8505753 | 12/1985 | WIPO . |
| WO9214225 | 8/1992 | WIPO . |

OTHER PUBLICATIONS

"Security and Energy Control System", Feb. 1985, Paul S. Sanik, Owens–Corning Fiberglass Corporation, Research Disclosure 25031.

*Primary Examiner*—Donnie L. Crosland
*Attorney, Agent, or Firm*—Weingarten, Schurgin, Gagnebin & Hayes LLP

[57] ABSTRACT

A surveillance and alarm device for room spaces, comprising an infrared radar for controlling the lights as well as a fire and burglar alarm. A basic alarm is provided with a light controller to be connected in series with a ceiling light fixture in a room under surveillance, and is further provided with a microprocessor or some other intelligent control circuit, adapted to control the alarm actions of said device either on the basis of a command issued by a lamp light switch or a wireless remote controller or on the basis of a command issued by a key switch. The light controller included in the basic alarm switches on said lighting fixture as someone enters a room under surveillance or flashes said lighting fixture in connection with an alarm.

5 Claims, 1 Drawing Sheet

SURVEILLANCE AND ALARM DEVICE FOR ROOM SPACES

The present invention relates to a surveillance and alarm device for room spaces, comprising an infrared radar for controlling the lights as well as a fire alarm and a burglar alarm.

An object of the invention is to provide a line of simple safety equipment for homes and offices that can be readily adopted and connected to existing electric and telephone equipment.

This object is achieved according to the invention on the basis of the characterizing features set forth in the appended claim 1.

Figure 1:
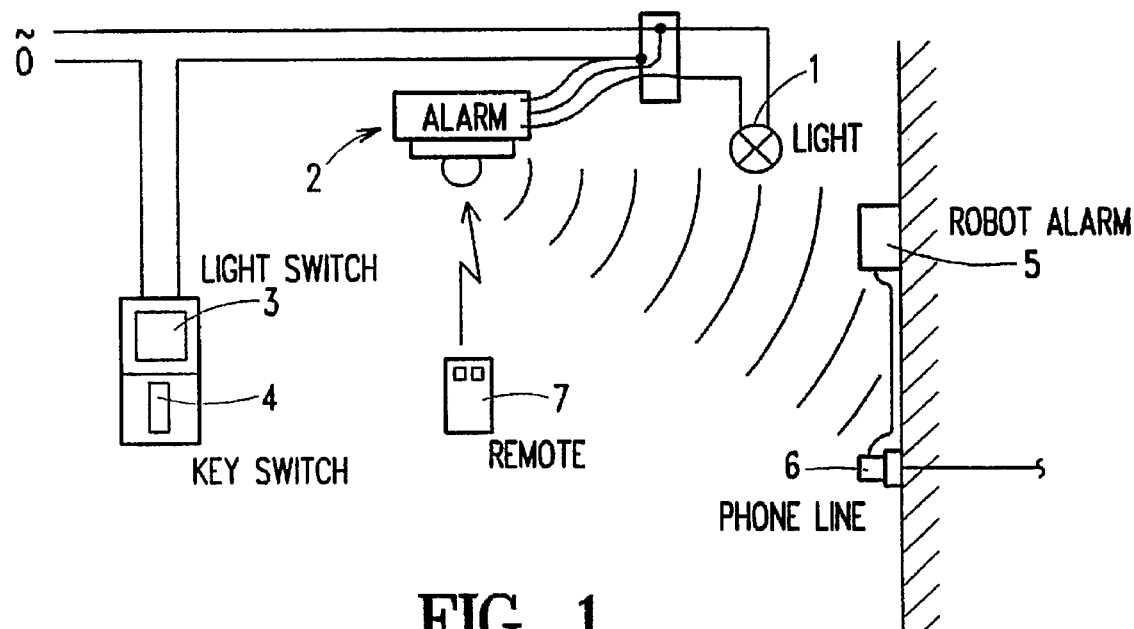
Figure 2:
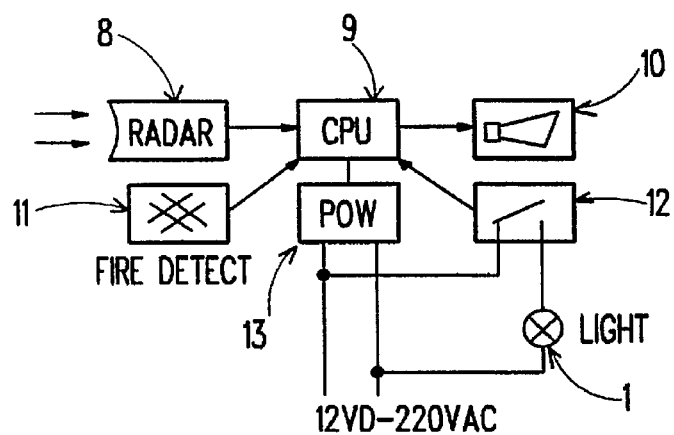

One exemplary embodiment of the invention will now be described in more detail with reference made to the accompanying drawing, in which FIG. 1 is a schematic view showing the wiring of a device of the invention to electric and telephone equipment and FIG. 2 shows a block diagram for the components included in a basic alarm 2.

The device comprises a basic alarm 2 to be connected in series with a ceiling light fixture 1 in the room to be placed under surveillance, said basic alarm including a fire detector 11 and a burglar-alarm infrared radar 8 and also a light controller 12 integrated in a single unit. The basic alarm 2 is provided with a microprocessor 9, which is adapted to control the actions of said device either on the basis of a command issued by a light switch 3 for lamp 1 or a remote controller 7 or on the basis of a command issued by a key switch 4. In its basic embodiment, the actions of alarm 2 are controlled by means of light switch 3. The control is effected by means of successive shorter or longer switch-on periods, issued by light switch 3 and set by a user.

One or a plurality of basic alarms 2 can also be controlled by means of a basic shunt switch, which is a key switch 4. The key switch 4 is connected either to light switch 3 or to a supply line for an array of lights. The key switch 4 is used for cutting away one half-wave whenever the alarm is active.

Thus, the basic alarm 2 produces an alarm both by sounding a siren 10 and by flashing the lights of lamp 1. Especially in the dark, such alarm is easily detectable from outside, even from a fair distance away. The basic alarm 2 includes also an automatically rechargeable backup voltage source 13 and, thus, the replacement of batteries is avoided. When a light controller 12 included in basic alarm 2 is in activated state, it switches on the light in a normal manner when somebody enters the room under surveillance.

As an accessory, the device includes a robot alarm 5 to be connected with a telephone line by means of a tap socket 6 and including no keyboard for identifying the alarms by means of sequencing the siren sound of basic alarm 2. Hence, the robot alarm 5 does not require any input or output delays. The programming of robot 5 can be effected by means of a normal telephone and such robot can be connected as a separate unit without acutal installation or fixing of sensors. The robot alarm 5 includes a microprocessor for analyzing an alarm signal and calling the emergency numbers. Thus, this microprocessor is set in various operational states through the intermediary of telephone. Furthermore, in addition to or instead of a light switch, it is also possible to employ a wireless remote controller 7 for the alarm control.

The invention is by no means limited to the above exemplary embodiment but there are several alternatives for a skilled person to utilize the following and most important characteristics of the invention:

- connectable to a lighting fixture
- three devices in one: a fire and burglar alarm as well as automatic control for lights
- flashing of lights in alarm situation
- wireless transmission of alarm to a further alarm and/or additional alarms as a sequenced sound or a radio-frequency code
- connection of several alarms in series For example, said microprocessor 9 can be replaced with other intelligent circuit designs possessing a sufficient data processing capability for a sufficiently reliable analysis of the messages received from sensors 8 and 11 and for controlling said signalling devices 10 and 12 on the basis of such analysis.

I claim:

1. A surveillance device adapted for use with a primary light fixture and a light switch in a room, comprising:

a fire detection sensor;

an infrared radiation detector; and a control circuit having a microprocessor, the control circuit connected to the light fixture, light switch, fire detection sensor and infrared radiation detector, and the control circuit being adapted to control the surveillance device and the light fixture in response to first and second inputs which are made by operating the light switch to affect, in a predetermined manner, successive switch-ON and switch-OFF periods of at least first and second respective durations such that, in response to the first input, the control circuit monitors the infrared radiation detector and switches the light fixture ON if infrared radiation is detected by the infrared radiation detector, and switches the light fixture OFF if infrared radiation is not detected; and in response to the second input, the control circuit monitors the fire detection sensor and infrared radiation detector to provide an alarm condition by toggling the light fixture rapidly between ON and OFF if either fire or infrared radiation is detected and, until such is detected, maintains the light fixture switched-OFF.

2. The surveillance device set forth in claim 1, further including a key switch connected to the light switch, the key switch being operative to disable the alarm condition.

3. The surveillance device as set forth in claim 1, characterized in that said device includes a robot alarm connected to a telephone line, said robot alarm operative in response to the control circuit during the alarm condition to call at least one particular emergency number in response thereto.

4. The surveillance device as set forth in claim 3, characterized in that the robot alarm is further operative in response to the control circuit to call a first emergency number upon detection of fire and to call a second emergency number upon detection of infrared radiation.

5. The surveillance device set forth in claim 1, characterized in that the control circuit is connected to a supply line for a series of secondary lighting fixtures, such that each lighting fixture in the series of lighting fixtures operates under the control of the control circuit in the same manner as the primary light fixture.

* * * * *